United States Patent [19]
Schneider

[11] Patent Number: 5,123,494
[45] Date of Patent: Jun. 23, 1992

[54] ANTI-THEFT WEIGHING SYSTEM

[76] Inventor: Howard Schneider, 149 Finchley Road, Montreal, Quebec H3X 3A3, Canada

[21] Appl. No.: 650,026

[22] Filed: Feb. 4, 1991

[51] Int. Cl.⁵ ............................................. G01G 19/52
[52] U.S. Cl. ........................................ 177/50; 177/200
[58] Field of Search ............................. 177/1, 50, 200

[56] References Cited

U.S. PATENT DOCUMENTS

| | | | |
|---|---|---|---|
| 3,750,158 | 7/1973 | Anastassakis | 177/50 X |
| 4,676,343 | 6/1987 | Humble et al. | 177/50 X |
| 4,779,706 | 10/1988 | Mergenthaler | 177/50 X |
| 4,787,467 | 11/1988 | Johnson | 177/50 |
| 4,792,018 | 12/1988 | Humble et al. | 177/50 X |

FOREIGN PATENT DOCUMENTS 2139997 2/1973 Fed. Rep. of Germany .......... 177/1

Primary Examiner—George H. Miller, Jr.

[57] ABSTRACT

The present invention describes a method and apparatus for weighing customers entering and leaving a store, or a user entering and leaving a particular institution or a worker entering and leaving the workplace and ascertaining automatically that the equivalence of the said two weight values do not indicate that any goods have been fraudulently removed by the person in question and where said equivalence does not occur, initiates an alarm protocol. In the preferred embodiment of the present invention the customer is weighed upon entering the retail store and is given a bar coded printed token indicative of his/her weight. At the checkout stand, with the customer's purchased products still resting typically in the shopping cart or on the checkout stand, the customer is weighed again and scans in the bar coded printed token previously obtained. The customer's weight should remain significantly unchanged if no products have been fraudulently obtained. If such equivalence does not exist then an alarm protocol is automatically initiated.

3 Claims, 11 Drawing Sheets

ANTI-THEFT WEIGHING SYSTEM

FIELD OF INVENTION

The present invention relates to commercial, industrial and institutional anti-theft security systems.

BACKGROUND OF THE INVENTION

Many electronic retail (and institutional, e.g. libraries) anti-theft security systems in commercial use utilise activatable ferromagnetic memory labels. Such labels are removed or deactivated at purchase time so that such labels will not trigger an alarm system attached to a magnetic field interrogation zone typically at the exit doorway of the establishment. For example, Peterson U.S. Pat. No. 4,158,434—Electronic Status Determining System For Goods, discloses such a system. A major problem inherent in such systems is that a suitable specialized label must be applied to every retail article for which security protection is desired. In a retail environment such as a supermarket, for example, the profit margins are too low to economically justify such application of specialized labels.

Weighing systems have been proposed in the past as security means for retail self-serve checkout systems. For example, Clyne U.S. Pat. No. 4,373,133—Method For Producing A Bill, Apparatus For Collecting Items, And a Self-Serve Shop, Mergenthaler U.S. Pat. No. 4,779,706—Self-Service System, and Johnson U.S. Pat. No. 4,787,467—Automated Self-Service Checkout System, disclose weighing system as security means for retail self-serve checkout systems. However, all these latter inventions suffer from the limitation that should a customer steal a product by hiding said product within one's clothing or carried bags, the latter inventions would not detect the theft.

Poisson U.S. Pat. No. 4,405,856—Apparatus For Recording Identifying Data Concerning The Use Of A Credit Card, Cheque Or The Like, discloses the weighing of a customer for security reasons in financial transactions, but does not develop the idea with respect to retail security concerns.

SUMMARY OF THE INVENTION

The present invention describes a method and apparatus for a retail (or institutional or industrial) security system. The present invention describes a method and apparatus for ascertaining that the weight of a customer entering the retail store (or other premises) is equal to the weight of the customer leaving the retail store minus the weight of the purchased products.

In the preferred embodiment of the present invention the customer is weighed upon entering the retail store and is given a bar coded (or otherwise encoded) printed receipt or token indicative of his/her weight. At the checkout stand, with the customer's purchased products still resting typically in the shopping cart or on the checkout stand, the customer is weighed again and scans in the bar coded printed token previously obtained (or in the case of other encoding methods enters the data appropriately, with or without the assistance of a store cashier). The customer's weight should remain significantly unchanged if no products have been fraudulently obtained.

In an alternative embodiment of the present invention, one that is particularly useful with self-serve checkout stations where the weigh of the purchased products is precisely known, the customer is weighed again along with the purchased products. The customer's weight including the weight of the purchased products at this time should equal the customer's weight upon entering the store as indicated by the printed typically bar coded token plus the weight of the purchased products.

Regardless of the embodiment chosen, essential features of the present invention include an entrance weighing scale, an exit weighing scale (or the use of the former a second time), storage means to store the weight upon entering the establishment, storage means to store the weight upon leaving the establishment, comparison means to compare entrance versus exit weights and alarm means to take appropriate action should the comparison operation so indicate.

Although the main commercial intention of the present invention is for retail stores, the methods and apparatuses disclosed herein apply equally well to institutional settings where fraudulent obtention of materials is a concern, e.g., libraries and to workplace settings where theft of inventory is a concern. In the former case of libraries, library users would be weighed upon entering the library and weighed again upon leaving the library, using one or the other embodiments discussed above. In the case of workplace settings workers could be weighed entering the facilities as well as leaving the facilities to make sure that no inventory items have fraudulently been obtained. Workplace settings can range from warehouses where there is concern that workers are stealing inventory to hotels where there is concern that maids are stealing room or guest furnishings. It should be noted that one of the major sources of retail theft is by employees who work in the corresponding retail establishments. Thus, there is utility in weighing such retail employees entering and leaving the premises if theft by such employees is a concern.

Persons' weights decrease naturally by perspiration and to a lessor extent by expelling carbon dioxide due to metabolic processes. Persons' weights decreased naturally even more significantly by urination and by defecation. Persons' weights increase significantly by drinking and eating.

During, for the sake of example, a one-half hour supermarket shopping exercise, the weight decrease will be insignificant compared to the weight of most products for sale, thus posing little problems for the operation of the present invention. Even customers receiving and eating samples of food, typically less than 5 or 10 grams worth, will pose little problems for the operation of the present invention if it is considered that there are relatively few, if any, products in most supermarkets weighing less than 25 grams. If customers use washroom facilities in the supermarket then their weight will decrease, which can be accepted as being non-indicative of theft activity. However, a decrease in weight can also represent that the customer came into the store with a non-valuable weight such as a rock and then discarded the rock in favour of a valuable food item, which happened to weigh less than the said rock. If the latter actions represent an economically important source of losses for the supermarket (or other commercial or institutional premises) then it is necessary to place a weighing scale at the washroom facilities entrance.

In the case of commercial, industrial or institutional workers, it must be considered what is the weight and the value of the items for which theft prevention is desired. If the items are not particularly valuable and if the items typically weigh significantly more than the average daily weight changes expected, then weighing workers at start time and finish time is sufficient. If items are particularly valuable such that there is the temptation to switch non-valuable weights with such items or if the items typically weigh within the range of naturally occurring daily person weight fluctuations, then it is necessary to weigh workers before and after using the washroom and before and after using the lunchroom (or upon leaving and returning from lunch taken exterior to the premises). If workers are performing large amounts of physical labor such that perspiration changes and ingestion of water will cause significant weight changes, then there exists the need for periodical weighing during the course of the work day.

Weighing may be taken by many to be an invasion of a person's privacy, especially in the case of those persons having weight problems. Thus, it is preferable that weight tokens given to a customer or a worker always be in encoded form such that the person cannot detect any relation between the token and his/her weight. Non-alphanumeric coded tokens such as bar codes would seem to be an ideal media for protecting persons' privacy as to their weight.

DESCRIPTION OF PREFERRED EMBODIMENTS AND PRACTICES

Figure 1:
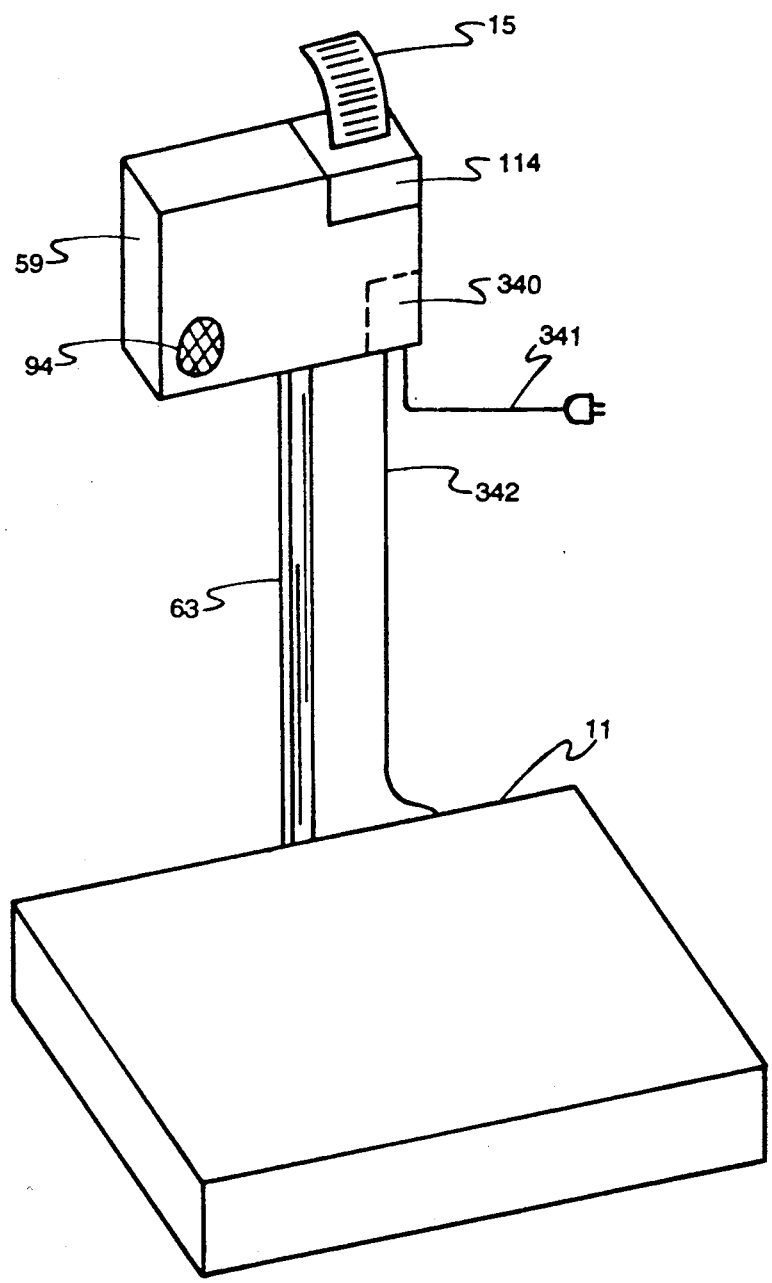
FIG. 1 is a perspective view of a preferred embodiment of the present invention depicting an entrance scale with bar coded token generator.

FIG. 1 depicts an entrance scale 11 with bar coded token generator 59. Upon entering the store premises, the customer steps onto scale 11 and receives typically in a matter of seconds from printer 114 a bar coded token 15 indicative of his/her weight. If the customer leaves the scale 11 before a valid weight reading has been obtained, then the speaker 94 will prompt the customer to remain on the scale 11.

As was noted above, the present invention is useful not only for theft prevention with respect to retail customers, but also for institutional clients, retail workers and industrial workers. For the sake of clarity reference will be made herein to 'customers' and the 'store'. However, the term 'customer' can equivalently be replaced by 'client', 'user', 'patron', 'employee', etc., and the term 'store' can equivalently be replaced by 'institution', 'library', 'premises', 'warehouse', 'factory', 'hotel', etc.

The embodiment of the entrance scale 11 and receipt generator 59 shown in FIG. 1 is a preferred embodiment of this portion of the present invention. An alternative embodiment will be presented later. However, many additional alternative embodiments are conceivable by making small changes to the embodiment shown in FIG. 1. For example, speaker 94 could be replaced by a visual source or any one of a multitude of audio/visual/tactile transducers. It is also conceivable to simply not include speaker 94 and simply not print a bar coded token 15 if a stable weight reading is not obtained. As mentioned above, bar coding a token indicative of weight has many advantages compared to simply printing one's weight. However, it easily conceivable to construct alternative embodiments where no or other encoding methods well known in the art are utilized. Similarly, printed tokens are a viable method given the availability of low cost bar code printers. However, as will be shown in an alternative embodiment later, tokens can be magnetic or electrical in nature as well.

Continuing with FIG. 1, the electrical signal from scale 11 travels along wire cable 342 to electronic circuitry enclosure 340. Power cable 341 plugs into a standard electrical outlet and provides power to electronic circuitry enclosure 340. The elements of the bar coded token generator 59 are supported at approximately waist height above scale 11 by pole structure 63. Scale 11 is depicted in FIG. 1 are requiring a step up onto the scale and step down off the scale. However, in actual use, it may be desirable fix scale 11 in a hole in the floor so that the customer takes a level path onto and off scale 11.

Figure 2:
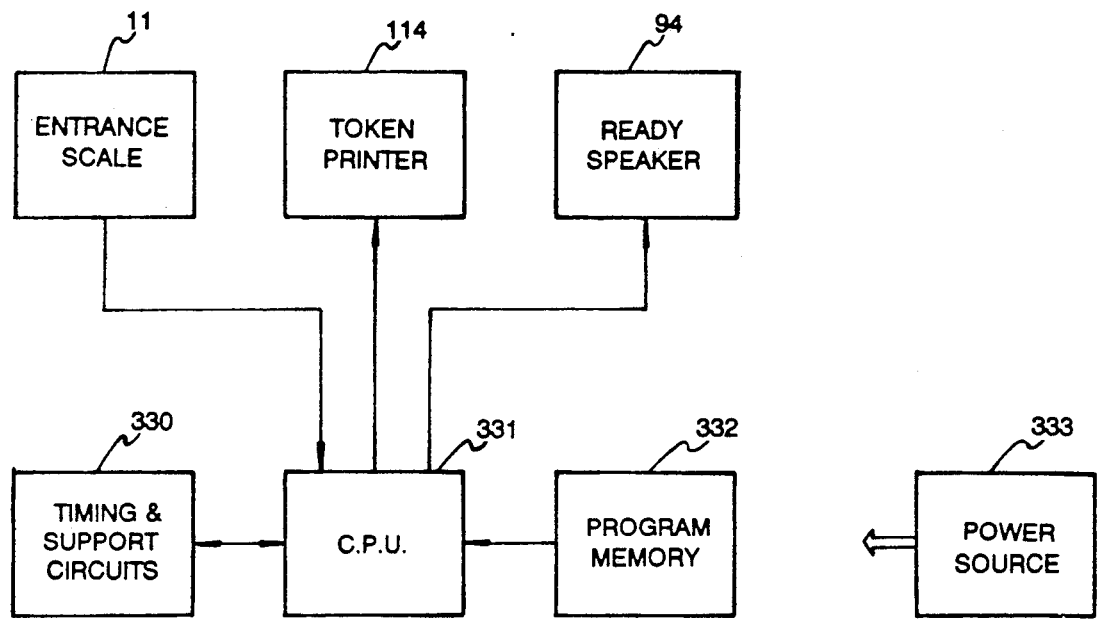
FIG. 2 is a functional diagram of the entrance scale with bar coded token generator shown in FIG. 1.

FIG. 2 is a functional diagram of the electronic components of the entrance scale/receipt generator shown in FIG. 1. CPU (central processing unit) circuit 331, controlled by a program memory 332 and supported by timing/support circuits 330, receives weight signals from entrance scale 11 and in turn sends appropriate signals to token printer 114 and to ready speaker 94. Power source 333 converts the voltage on power cable 341 to the voltage level(s) required by the circuits of FIG. 2. Although CPU circuit 331, controlled by a program memory 332 and supported by timing/support circuits 330 could all be replaced by discrete circuits performing discrete functions, advances in electronic technology have made it economically advantegeous to perform the same fucnctions by using standardized central processing unit circuits controlled by binary codes placed in a memory unit such as program memory 332. The latter approach may in fact require several orders of magnitude more transistors to perform the same functions but due to the development of mass produced standardized yet easily customizable integrated circuits containing the equivalent of CPU circuit 331, program memory 332 and timing/support circuits 330 on a single semiconductor chip, this approach is far more economical.

In the preferred embodiment of the present invention, entrance scale 11 continuously sends weight signals to CPU 331. It thus left to CPU 331 to decide what is a valid or stable weight measurement. It is also left to the resources of CPU 331 to use computational techniques to estimate, in a fraction of the time required for a conventional stable weight reading, the actual weight on scale 11 from the rate of change in weight. Such techniques are disclosed by Schneider, U.S. Pat. Application—Fast Retail Security Weighing System. In other embodiments of the present invention, it is conceivable, of course, to have scale 11 perform processing of the weight signals and to transmit to CPU 331 only stable, valid weight signals.

Figure 3:
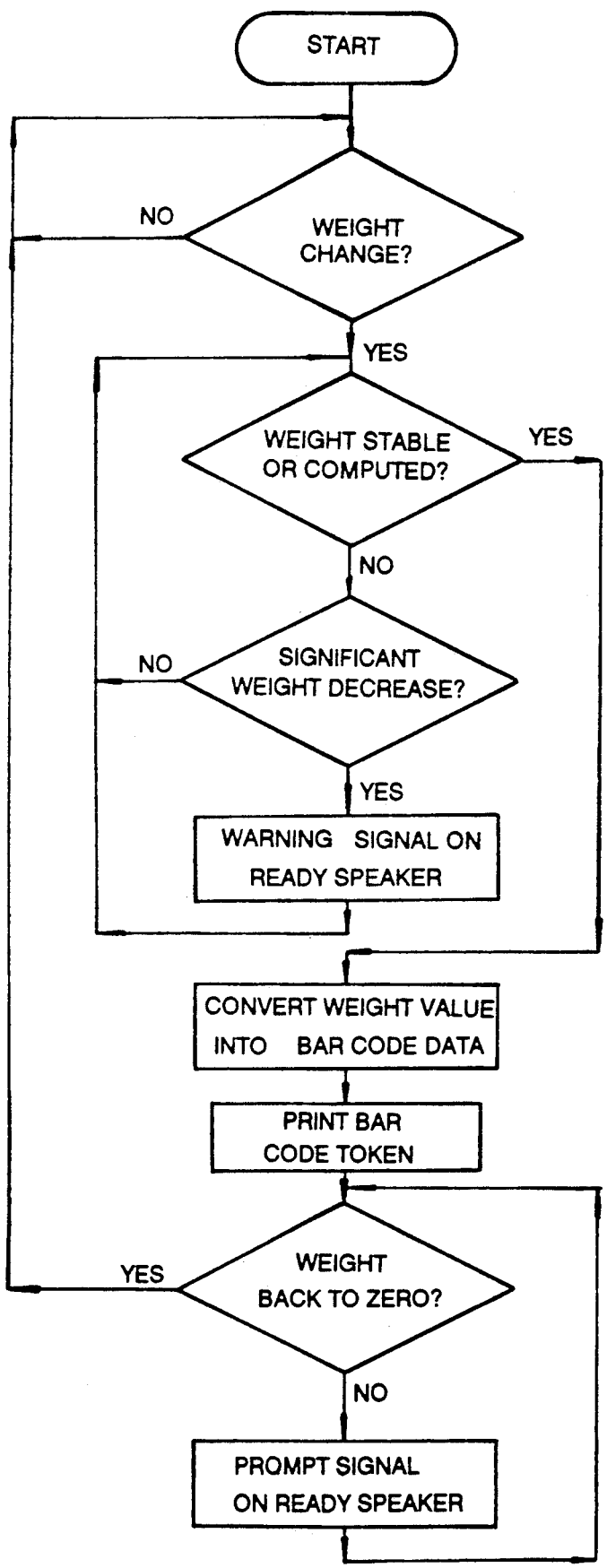
FIG. 3 is a logical diagram of the entrance scale with bar coded token generator shown in FIG. 1.

FIG. 3 is a logical diagram representing the logical steps programmed in program memory 332, i.e., CPU 331 follows the logical steps shown in FIG. 3 to decide what output signals to send to the token printer 114 and the ready speaker 94 based on the input signal received from the entrance scale 11. As shown in FIG. 3, CPU 331 starts off by continuously examining scale 11 for a change in the weight signal being received. If a significant change is detected, then the next step is to see if this weight change is stable or is it possible to compute what the stable weight should be from the rate of change of the weight signal. CPU 331 will continuously examine the weight signal for a stable weight signal (or if possible compute a stable weight value). If a weight decrease occurs during this time indicating that the customer has prematurely gotten off the scale 11, then a warning signal is sent to speaker 94. Once a stable weight signal is obtained, CPU 331 follows steps given in program memory 332 to convert the weight signal into signals which token printer 114 can use to print a bar code indicative of the said weight signal, and CPU 331 sends these signals to token printer 114. CPU 331 then checks to see if the customer has left the scale, i.e., has weight returned back to zero, and if not so prompts the customer. After the scale has returned back to zero, CPU 331 starts the above routines all over again.

The logical steps shown in FIG. 3 will enable one skilled in the art to construct the preferred embodiment of the scale/token generator of the present invention. However, note that for the sake of clarity, FIG. 3 does not show the detailed housekeeping logic, the error control logic, weight signal conversion logic and the bar code generation logic required. All these are well known in the art. Many commercial companies offer for sale to programmers bar code software routines suitable for a multitude of bar coding schemes. As one skilled in the art knows, error control logic requires that an exit be allowed from any routine that may be occurring by error. For example, if someone momentarily steps onto scale 11 and then steps off, then after several seconds of a zero weight signal being received, CPU 331 should restart the routines, rather than keep on waiting for a stable, valid weight signal or inappropriately cause token printer 114 to print a bar coded token indicative of a zero weight reading. Housekeeping logic routines and weight signal conversion routines are well known in the art.

Figure 4:
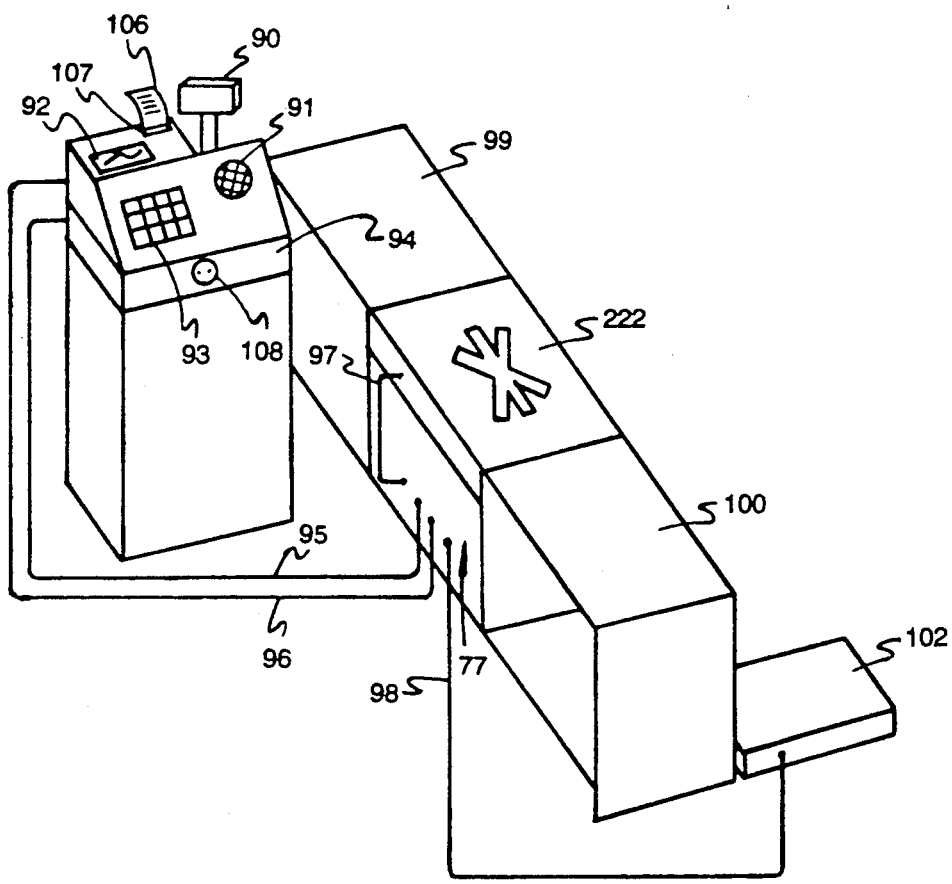
FIG. 4 is a perspective view of a preferred embodiment of the present invention depicting a checkout station with an exit scale.

FIG. 4 is a perspective view of a preferred embodiment of the present invention depicting exit scale 102 adjacent to a conventional checkout station typical of supermarket and other retail environments. As noted above, typically said scale means are placed in depressions in the floors where they reside so as allow level movement on and off said scales. Customers typically place their purchased items on platform 99. A cashier typically moves purchased items, one by one, past bar code reader 222 onto bagging platform 100. Most retail purchased items will bar codes readable by bar code reader 222 where said bar codes are indicative of the product code of the particular purchased item. Bar code reader 222 sends an electrical signal indicative of the purchased item's product code via wire cable 97 to computing unit 77. A product lookup table exists within computing unit 77, or is accessible by computing unit 77, so as to obtain the actual price and a product description for the particular purchased item. The product's price and description may then be sent by computing unit 77 via wire cable 96 to price/description display 90 as well as to receipt printer 107 where this information is printed on receipt 106. For products without valid bar code information, e.g. produce, the cashier typically uses operator keypad 93 to enter information. Operator display 92 allows computing unit 77 to prompt the cashier as required. Speaker 91 allows computing unit 77 to prompt the cashier and/or the customer as required. Cash drawer 94 is used to hold payments received and to make change. It can be opened electronically via wire cable 95 under the control of computing unit 77 or via a key inserted into lock 108.

In the preferred embodiment of the present invention, as shown in FIG. 4, exit scale 102 is synergistically connected via wire cable 98 to computing unit 77. Much of the electronic equipment that would otherwise be necessary for the present invention exists within the existing electronics of typical modern retail checkout stations. In the preferred embodiment of the present invention, after the customer has finished his/her order, the customer hands his/her bar coded token 15 to the cashier and then the customer steps onto scale 102. The cashier reads the bar coded token 15 with the bar code reader 222. The computing unit 77 then makes sure that the weight read by the bar code reader 222 from the bar coded token 15 is equal within a typically predetermined range, to the weight currently being transmitted by scale 102. If the customer has fraudulently hidden an article on his/her body, then the weight currently being transmitted by scale 102 will exceed the weight indicated on the bar coded token 15. In such a case, the computing unit 77 could prompt the operator via display 92 as well as making a distinct sound via speaker 91. On the other hand, if the current weight being transmitted by scale 102 is approximately equal to the weight indicated by bar coded token 15, then the order is considered terminated and the customer can collect his/her purchased items (perhaps bagged at this point) from platform 100 and leave the store.

In the preferred embodiment of the present invention discussed herein, it is expected that the customer give the cashier his/her bar coded token 15 when the order is finished, i.e., all items entered and paid for. It is easy to conceive of alternative embodiments whereby bar coded token 15 is read by bar code reader 222 at some other time. For example, at the start of the order the weight indicated by the bar coded token 15 could be compared against the customer's current weight transmitted by scale 102. An additional alternative embodiment could easily allow the bar coded token 15 to be read at any time and to save the weight value indicated by bar coded token 15 in a memory register within computing unit 77. At a later time when the customer steps onto scale 102, computing unit 77 could automatically notice an increase in weight on scale 102 and thus automatically perform a comparison operation between the weight being transmitted by scale 102 and the weight stored in said memory register. Or a similar operation could manually be triggered by the cashier pressing an appropriate button on the operator keyboard 93.

Figure 5:
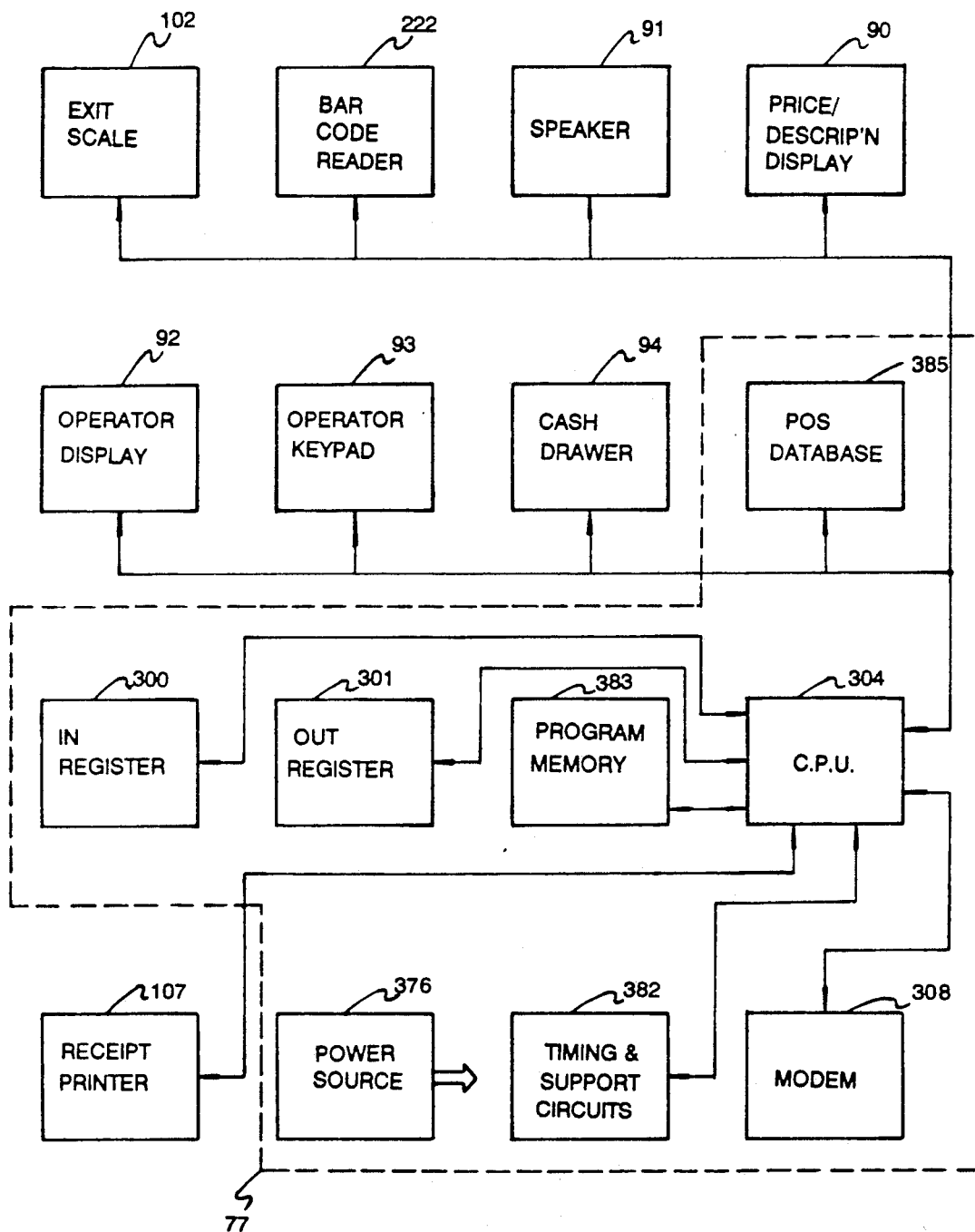
FIG. 5 is a functional diagram of the checkout station with exit scale shown in FIG. 4

FIG. 5 is a functional diagram of the exit scale 102 and adjacent checkout station shown in FIG. 4. As was discussed above, the circuits of computing unit 77 communicate with the exit scale 102, the bar code reader 222, speaker 91, price/description display 90, operator display 92, operator keypad 93, cash drawer 94 and receipt printer 107. Such communication is typically via wire cables, although other means of data communication are well known in the art. The major circuit groups within computing unit 77 are shown in FIG. 5. As was discussed previously, it is economically advantageous to use a CPU controlled by a program memory instead of a smaller number of discrete transistors to perform the same function. Thus, in the preferred embodiment of the present invention, computing unit 77 is controlled by CPU 304 following logical steps given by program memory 383 and supported by timing and support circuits 382. Power source 376 transform the standard line voltage into the voltages required by the electronic circuits of computing unit 77 and can optionally be used to provide the necessary low voltage power required by circuits exterior to the computing unit 77. POS (point of sale) database 385 is a product lookup table typically indexed by product code number such that with presentation of the product code number, CPU 304 is able to obtain at a minimum product description, tax status and price required for sales transaction. POS database is often stored in RAM memory for fast lookup speed, with updates coming from a centralized database via modem 308. POS database 385 is shown incorporated within computing unit 77 although in other embodiments of the present invention a single POS database may be shared among many checkout stations with data communication between the CPU 304, a local modem and the POS database. In other embodiments, computing unit 77 in fact may operate in multitasking fashion and be shared among many checkout stations. IN-REGISTER 300 and OUT-REGISTER 301 are two simple memory registers, similar to the many such memory registers in the timing/support circuits 382. However, registers 300 and 301 are described in a prominent fashion in FIG. 5 because they are being devoted to the antitheft weighing functions of the present invention, and if the electronic circuitry (less the exit scale 102, of course) were being used solely for normal checkout duty, then registers 300 and 301 would not be required.

Figure 6:
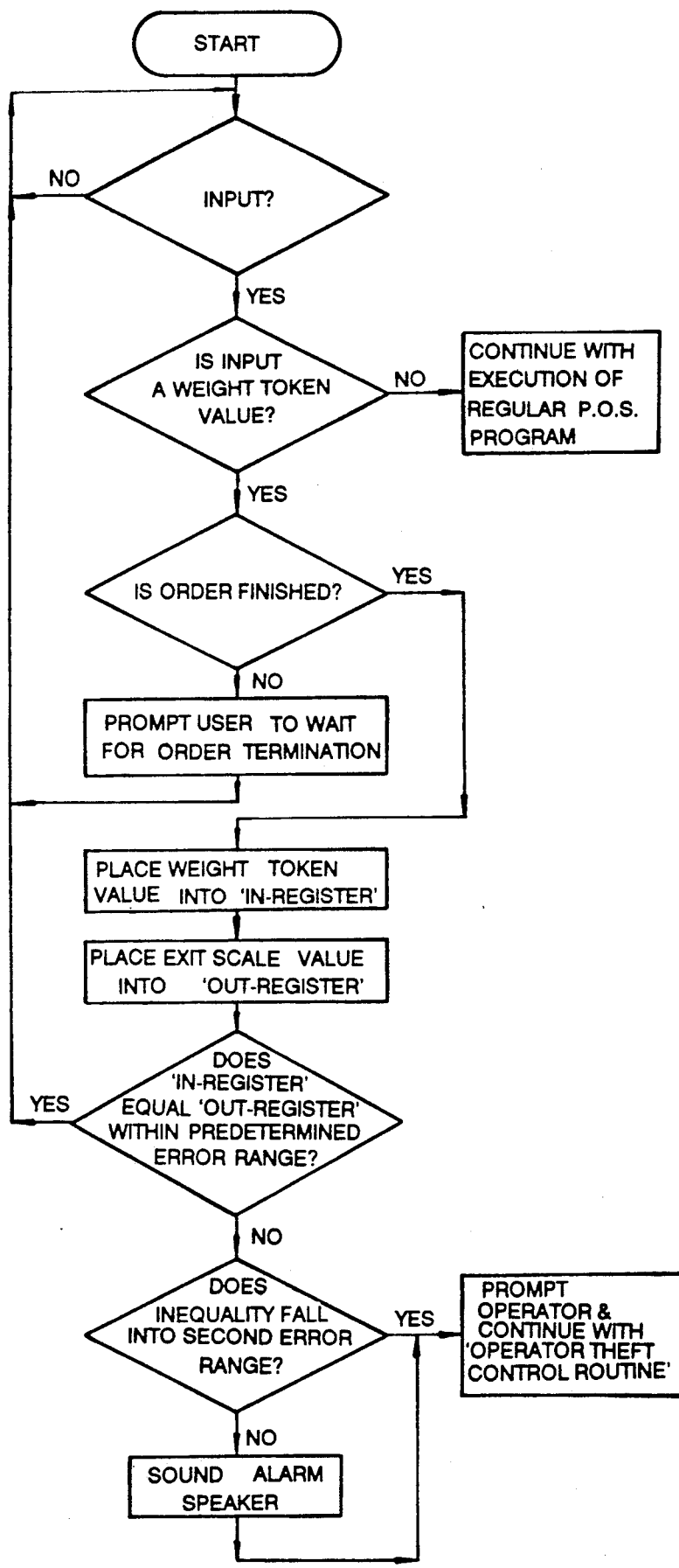
FIG. 6 is a logical diagram of the checkout station with exit scale shown in FIG. 4 with emphasis on checkout weighing operations.

FIG. 6 is a logical diagram of the steps which program memory 383 causes CPU 304 to take. For the sake of clarity, housekeeping logic, error control logic, and the logic for regular point of sale checkout station operation is well known in the art and is thus not shown in FIG. 6. The program starts by having CPU 304 wait for inputs either from the bar code reader 222 or the operator keypad 93. After an input has been received, the program causes the CPU 304 to examine the input code sequence to see if it is a weight value which has been read from a bar coded token (for example, digits followed by the characters 'gms' could be considered to be such a weight value). If not, then the program continues the regular point of sale logical steps, e.g., fetching prices and descriptions from the POS database 385, printing receipts, totalling receipts, opening the cash drawer, calculating change for payment received, etc. If however, the input code sequence was representative of a weight value then the program then verifies if the order has been completed (i.e., paid for, as discussed above in this embodiment of the present invention). If so, then the weight value obtained from the weight token 15 read by the bar code reader 222 is placed by CPU 304 into IN-REGISTER 300. The customer is expected to be on the exit scale 102 at this time and so the program instructs CPU 304 to place the weight signal received from exit scale 102 into OUT-REGISTER 301. The program then instructs CPU 304 to perform a comparison operation between IN-REGISTER 300 and OUT-REGISTER 301 to make sure that the values in both registers are within some predetermined absolute or percentage range of each other, e.g., 25 gms for a certain retail environment, e.g., 1% of weight for another environment, etc. If the values in the IN-REGISTER 300 and the OUT-REGISTER 301 are equal within the predetermined range, then the program has ended, the customer can now take his/her bags from the adjacent checkout station and leave the store and the program starts over again. However, if there is an inequality outside the predetermined range, then the program causes the CPU 304 to see if this inequality falls outside an even larger range. For example, if the first range was 25 grams, then this second larger range could be 150 grams. If the inequality falls outside this second larger range then this clearly indicates that there is a high probability that an article has been fraudulently obtained and so CPU 304 causes speaker 91 to sound an alarm sound. If, on the other hand, the inequality was outside the first predetermined range, but not outside the second larger one, then the possibility of a natural occurring weight change or an artifact change involving less than ideal weight instrumentation must be entertained, so the cashier is discretely advised by CPU 304 of the weight inequality via operator display 92. In either case, at this point the cashier must make a decision. The 'Operator Theft Control Routine' is a series of steps within program 383 which helps the cashier take the appropriate decision. For example, if the cashier sees the reason for the weight inequality, then the cashier can press a certain button on the operator keypad 93 causing the program to start over again. For example, if the cashier feels that the customer has stolen something, e.g., a customer wearing a bulking jacket capable of hiding many articles, the cashier can speak to the customer about this or follow a store approved security protocol. Perhaps pressing another particular button on the operator keypad 93 at this point causes CPU 304 to send a message via modem 308 to the store's minicomputer which in turn sends a message to the store manager or security agent.

The preferred embodiment of the present invention may be summarized as a system providing anti-theft protection to a given area wherein said system comprises: (a) first scale means located for use in proximity to the entrance of said area wherein said first scale means sends continuous weight signals indicative of the weight of a user upon said first scale means to a first information processing means wherein said first scale means is placed in a depression in the floor so as to allow level movement on and off of said first scale means; (b) said first information processing means, upon detecting a change in said continuous weight signals from said first scale means, computing, and wherein said continuous weight signals decreasing during said computation said first information processing means sending a warning signal to a prompting means, and sending in turn a signal indicative of a bar code indicative of the said signals from the said first scale means, to a bar code printing means: (c) said bar code printing means, upon receiving said signal indicative of a bar code from said first information processing means. printing a bar coded token for the said user indicative of the said user's entrance weight: (d) checkout station containing a checkout station bar code reader means and adjacently located second scale means both located at the exit of said area wherein said second scale means is placed in a depression in the floor so as to allow level movement on and off of said second scale means: (e) said checkout station bar code reader means sending a signal indicative of the weight value indicated by said bar coded token to a checkout station information processing means: (f) said checkout station information processing means, upon receiving said signal from said checkout station bar code reader means. placing a value indicative of said signal within a first memory register: (g) bagging area means wherein said user can temporarily leave bags containing purchased articles while said user is on said second scale means for exit weighing operation: (h) said second scale means sending a signal indicative of the weight of the said user upon said second scale means to said checkout station information processing means wherein said checkout station information processing means then places a value indicative of said signal within a second memory register: and (i) comparison by said checkout station information processing means of the contents of the said first memory register with the said second memory register wherein if the difference between the values of the two said memory registers exceeds a first predetermined value, then the said checkout station information processing means sends a weight inequality signal to an operator display associated with said checkout station whereupon an operator utilizes an operator keypad associated with said checkout station to send a decision signal back to said checkout station information processing means wherein said decision signal can alternatively instruct the said checkout station information processing means to ignore the difference between said two memory registers or can instruct the said checkout station information processing means to activate an alarm circuit, and wherein the difference between the values of the two said memory registers exceeds a second predetermined value then said alarm circuit is activated.

The phenomenon of multi-member shopping parties should be discussed at this point. It is a common occurrence, for example, for a family of a mother, father and three children to come shopping together. With the preferred embodiment of the present invention, in such an example, each member of the shopping party could step on scale 11 upon entering the store and receive an individual bar coded token 15. Upon leaving the store, each member of the shopping party could individually give his/her bar coded token 15 to the cashier and then step upon exit scale 102. Similarly, groups of members of the shopping party could step on scale 11 upon entering the store and receive a bar coded token 15 for each group, for example, mother and one child receiving a first token, father and one child receiving a second token, and the third child receiving a third token. Upon leaving the store, the mother and the same child would give their token to the cashier and would step together onto exit scale 102. The father and the corresponding child would then (actually, the order is not of significance) step onto the exit scale 102 and their combined weight would be checked against their weight token. The third child would then (again, please note that the order is not of significance) give his/her token to the cashier and would step onto exit scale 102. As useful enhancement to the preferred embodiment of the present invention for multi-member shopping parties, would be for program memory 383 to contain the logical steps to allow CPU 304 to summate in registers 300 and 301 cumulative weights for multi-member shopping parties, and when the cashier via operator keypad 93 indicated that all weight tokens and weighings had been completed. CPU 304 would only then perform a comparison operation between registers 300 and 301.

Figure 7:
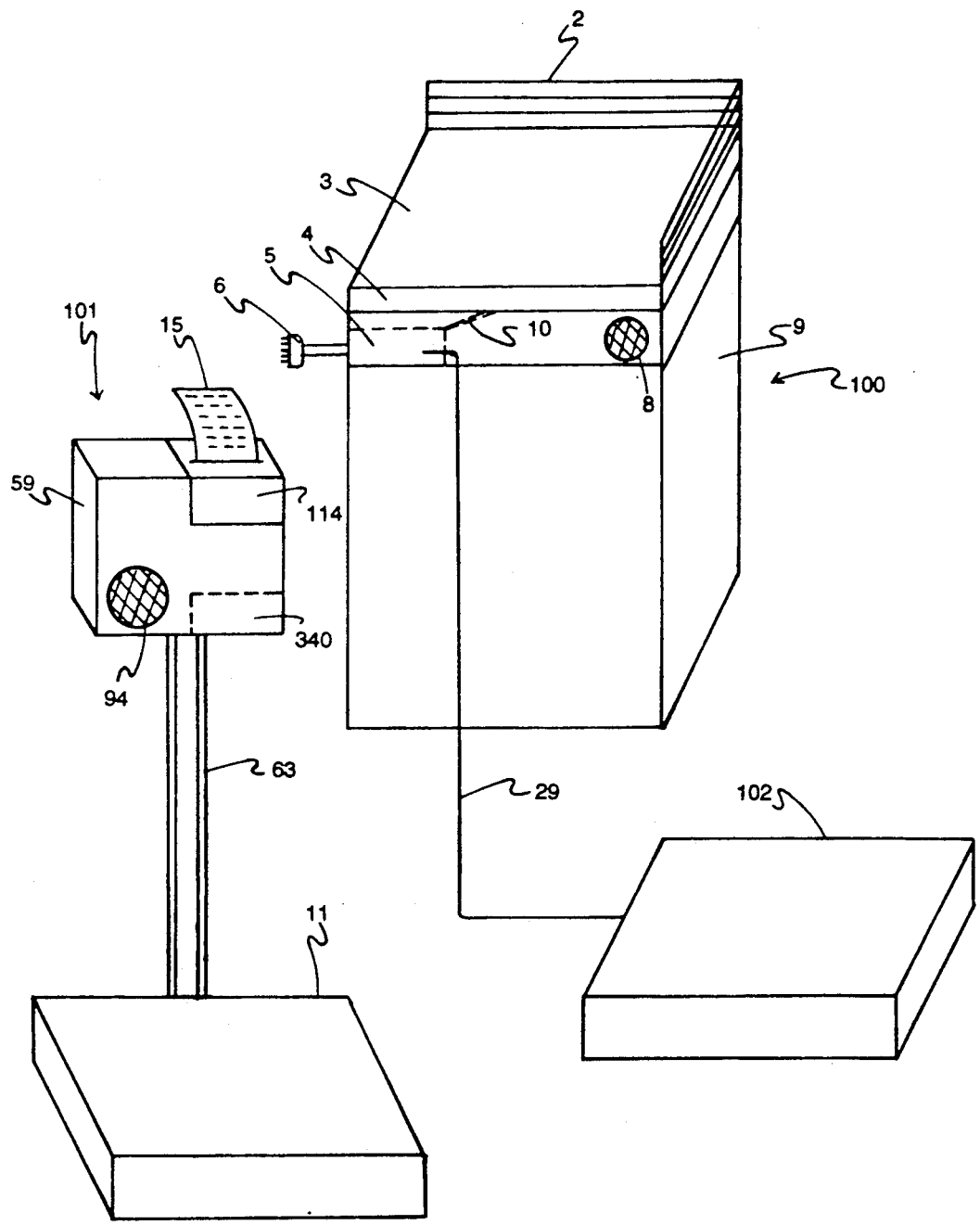
FIG. 7 is a perspective view of an alternative embodiment of the present invention depicting an entrance scale with token generator, a bag weighing scale and an exit scale.

FIG. 7 is a perspective view of an alternative embodiment of the present invention. The operation of scale/token generator 101 remains unchanged. Upon entering the store, the customer steps onto scale 11 and receives a bar coded token 15 indicative of his/her weight. However, this alternative embodiment includes a bagging scale 4 to precisely measure the weight of the bagged purchased products. In this embodiment the customer steps onto exit scale 102 with his/her purchased products. The weight of the purchased products, previously determined by bagging scale 4 plus the weight of the customer, determined by the value of the bar coded token 15 should equal the weight of the customer and products on the exit scale 102. A disadvantage of this alternative embodiment is that an additional bagging scale 4 is required. However in self-serve retail checkout systems, e.g., Schneider, U.S. Pat. Ser. No. 07/584,104, a bagging scale is already present. In such cases there is no additional cost in utilizing the alternative embodiment shown in FIG. 7.

The features of scale/token generator 101 shown in FIG. 7 have been discussed previously for the scale/token generator shown in FIG. 1. Exit scale 102 connects via a wire cable 29 to a junction box 5. Bagging scale 4 connects via wire cable 10 to junction box 5. Bagging unit 100 consists of wire side walls 2, bagging surface 3 and structural support 9. Alarm speaker 8, also attached electrically to junction box 5, serves to make an alarm sound as required. Junction box 5 attaches via cable 6 to the point of sale system.

Figure 8:
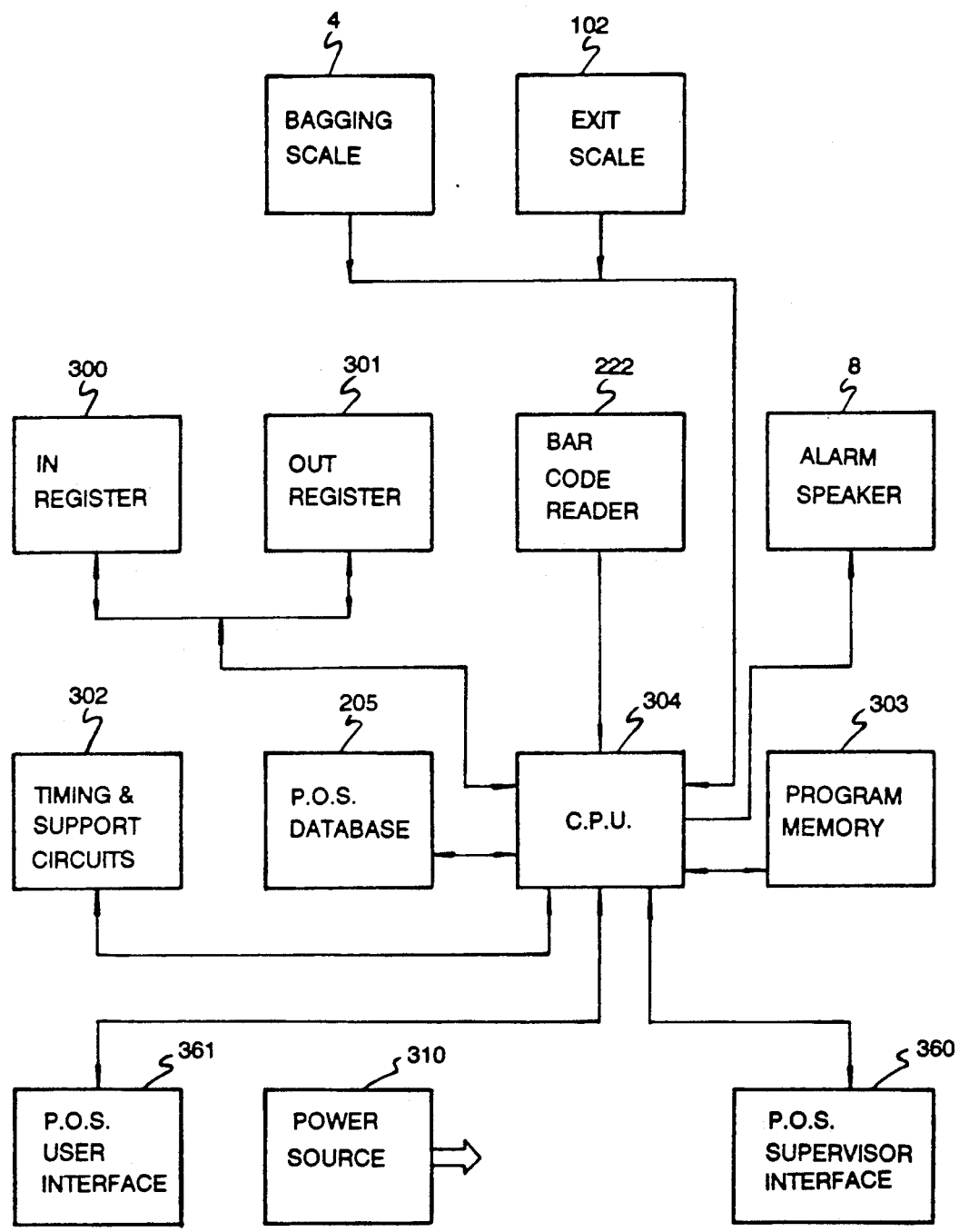
FIG. 8 is a functional diagram of a portion of the alternative embodiment presented in FIG.7.

FIG. 8 is a functional diagram showing the function of exit scale 102 and bagging scale 4 in the context of the point-of-sale system. Whether the point-of-sale system is a self-serve system, or a conventional checkout system, as discussed earlier there will be a CPU 304 controlled by a program memory, in this case program memory 303. Bar code reader 222, timing/support circuits 302, POS database 205, power source 310, POS user interface 361 (typically a display screen although in the case of self-serve checkout systems a keypad or equivalent input device would be provided), speaker 8, POS supervisor interface 360 (typically a keyboard and display screen), IN-REGISTER 300 and OUT-REGISTER 301 are similar in nature to corresponding elements previously discussed in FIG. 5. However, in this alternative embodiment of the present invention, CPU 304 (i.e., as directed by program memory 303) adds to the value of IN-REGISTER 300, which previously only contained the weight of the customer as indicated by the bar coded weight token 15, the weight signal received from the bagging scale. When the customer with the packed bags then steps onto the exit scale 102, the weight signal from the exit scale 102 is placed in OUT-REGISTER 301. The CPU 304 then performs a comparison operation between registers 300 and 301 to make sure that the weights fall within a predetermined acceptable range. If the weight values in registers 300 and 301 fall outside said range, then CPU 304 alerts the supervisor via the POS supervisor interface 360 and/or the customer via alarm speaker 8.

Figure 9:
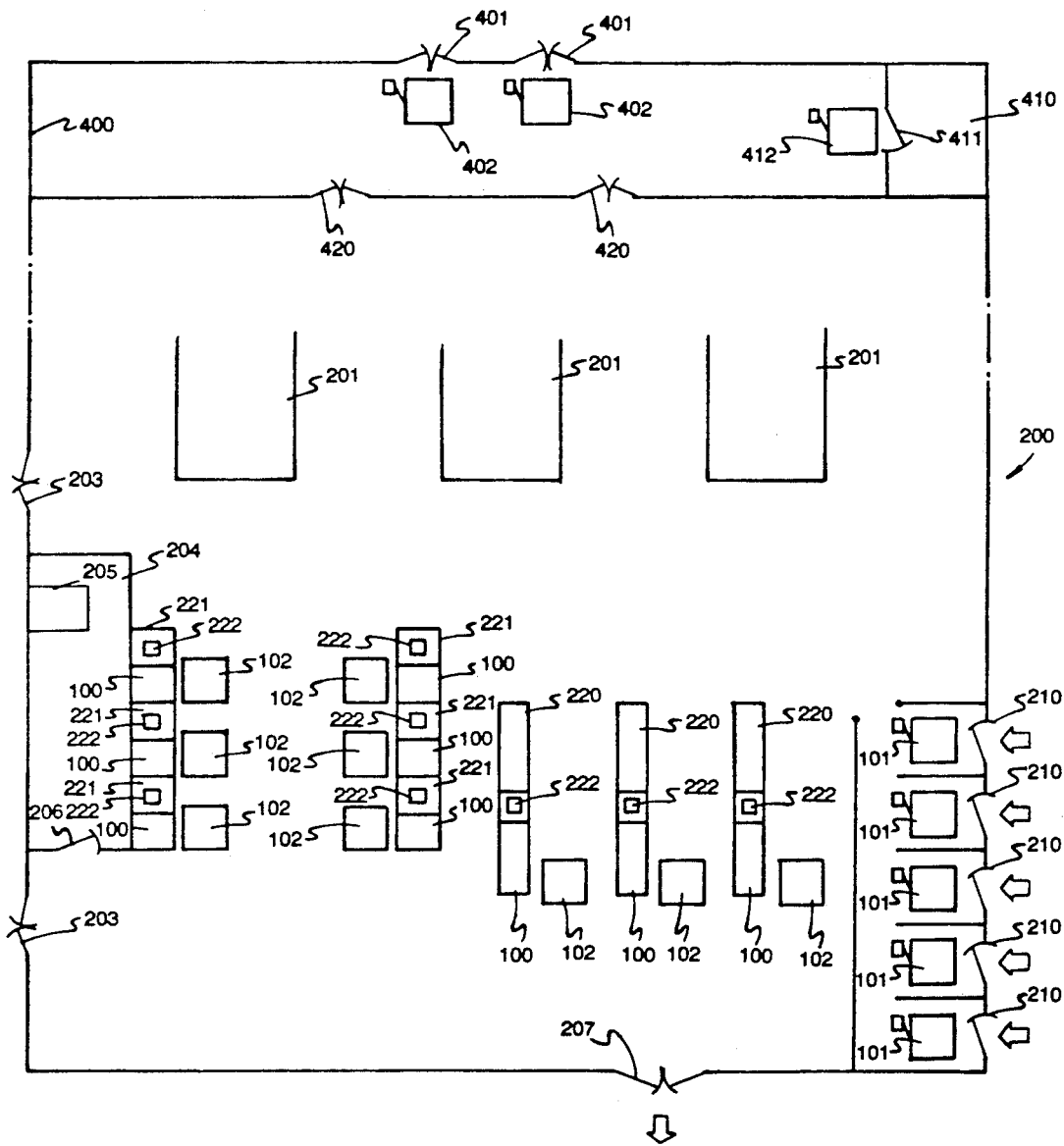
FIG. 9 is a plan view of supermarket incorporating the preferred embodiment of the present invention with regular checkout lanes and the alternative embodiment of the present invention with the self-serve checkout lanes.

FIG. 9 is a plan view of a supermarket 200 incorporating the preferred embodiment of the present invention with regular checkout lanes 220 and the alternative embodiment of the present invention with the self-serve checkout stations 221. Customers enter via entrance doors 210 and utilize entrance scale/bar coded weight token generators 101 to receive a bar coded weight token indicative of their weight entering the store. Customers then walk among product shelves 201 and select the products they wish to purchase. Some customers will then use the conventional checkout lanes 220. Purchased products' bar codes are typically read by bar code reader 222 and are then placed onto bagging area 100. After the order has finished, the customer gives the cashier the bar coded weight token received upon entry into the store. The cashier reads this bar coded weight token with the bar code reader 222. The customer then steps onto scale 102, without touching any of the articles on bagging area 100. The computing unit of the conventional checkout lane 220 receives the weight signal from scale 102 and makes sure that the customer's weight at this point is approximately equal to the weight upon entry to the store, as indicated by the weight token.

Some customers will use the self-serve checkout stations 221. Customers themselves use the bar code reader 222 to typically read purchased products' bar codes. Products are thereafter deposited onto the bagging area scale 100. At the end of the order the customer reads the bar code on his/her weight token via bar code reader 222 and then with all his/her packages steps onto scale 102. The computing unit of the self-serve checkout station 221 receives the weight signal from scale 102 and makes sure that the customer's weight at this point is approximately equal to the weight upon entry to the store as indicated by the weight token plus the weight of the purchased goods previously resting on the bagging area scale 100. Although not shown in FIG. 9, it is possible in alternative supermarket plans to allow the customer to obtain a shopping cart prior to utilizing the entrance scale/bar coded weight token generators 101. As such, the weight indicated on the bar coded weight token obtained can include the weight of the shopping cart and as such bags can be placed directly into the shopping cart prior to using exit scale 102 since the weight of the shopping cart is already accounted for.

Customers will typically exit the supermarket via exit doors 207. Exit doors 203 are provided for emergency exits only. Supermarket manager office 204, accessed via door 206, contains minicomputer 205 which attaches to all of the point of sale systems being used at the conventional lanes as well as the self-serve checkout stations.

At the rear of supermarket 200 is a small unloading/inventory area 400. Products are brought into the public area of the supermarket via doors 420. Workers bring products into the unloading/inventory area 400 from the exterior via loading doors 401. To one end of the unloading/inventory area 400 is washroom 410, accessed by door 411. In front of bathroom door 411 is scale/weight token generator 412, which is smaller but similar to scale/weight token generators 402 discussed below. In front of loading doors 401 are scale/weight token generators 402.

Figure 10:
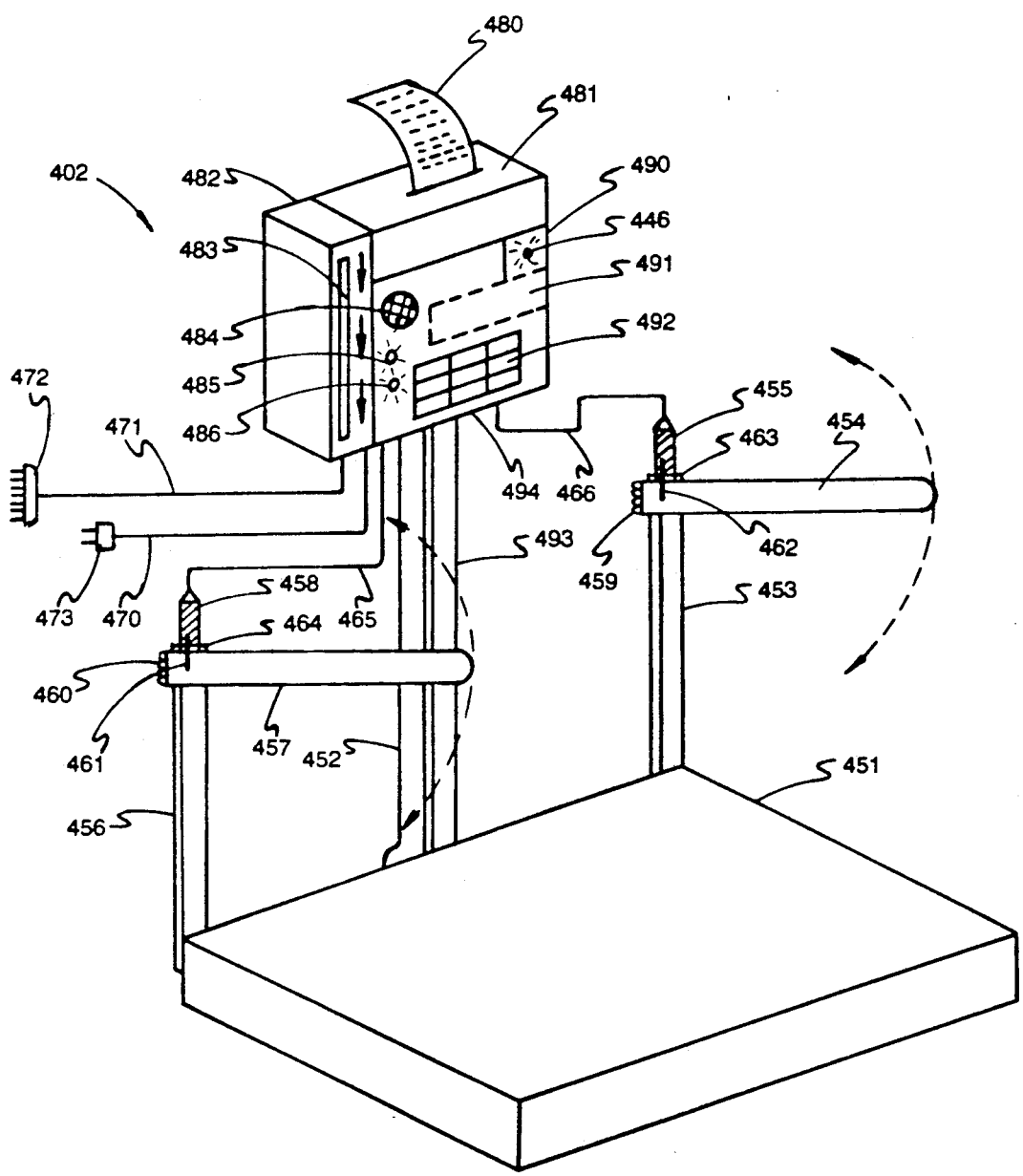
FIG. 10 is a perspective view of an additional alternative embodiment of the present invention depicting an entrance scale/token generator.

FIG. 10 is a perspective view of scale/weight token generator 402, which is an alternative embodiment of the present invention. Scale/weight token generator 402 is utilized here in the context of reducing store theft by employees of the supermarket shown in FIG. 9. However, many of the features of scale/weight token generator 402, are directly applicable to reducing store theft by customers as well as by users and workers of other institutions. Scale 451 sends a weight signal via wire cable 452 to electronic circuitry enclosure 491. Gate post 453 holds via spring-loaded hinge joint 459 gate arm 454 which is movable around the axis of spring-loaded hinge joint 459. Attached at the top of gate post 453 by connector 463 is solenoid latch 455. When the arm 462 of solenoid latch 455 is extended, motion of the gate arm 454 is inhibited. The extension state of arm 462 of solenoid latch 455 is controlled by electronic signals received from electronic circuitry enclosure 491 via wire cable 466. To allow for two-way gated operation, this embodiment of the present invention includes a second gate at the other end of scale 451. Gate post 456 holds via spring-loaded hinge joint 460 gate arm 457 which is movable around the axis of spring-loaded hinge joint 460. Attached at the top of gate post 456 by connector 464 is solenoid latch 458. When the arm 461 of solenoid latch 458 is extended, motion of the gate arm 457 is inhibited. The extension state of arm 461 of solenoid latch 458 is controlled by electronic signals received from electronic circuitry enclosure 491 via wire cable 465.

In the embodiment of the present invention shown in FIG. 10, scale 451 rests on the floor (or in a depression in the floor to avoid the need to step on and step off the scale 451). Gate posts 453 and 456 at attached physically to scale 451. Similarly, structural member 493 is attached physically to scale 451. The opposite end of structural member supports control box 494 which consists of the electronic circuitry enclosure 491 as well as various user interface devices. For the sake of clarity, in the embodiment shown in FIG. 10, wire cables 452, 465 and 466 are shown loose. It is conceivable that in an embodiment actually constructed that wire cables 452, 465 and 466 would run protected within the interior of structural member 493, or else other means of data communication would be used. Similarly, electric power cable 470, which plugs via plug 473 into a standard power outlet and provides power to the electronic circuitry enclosure 491 would not run loose as shown. Also, data communications cable 471 coming from the electronic circuitry enclosure 491 and terminating in data plug 472 would typically be protected within the interior of structural member 493 before leaving the bulk of the machine.

Figure 11:
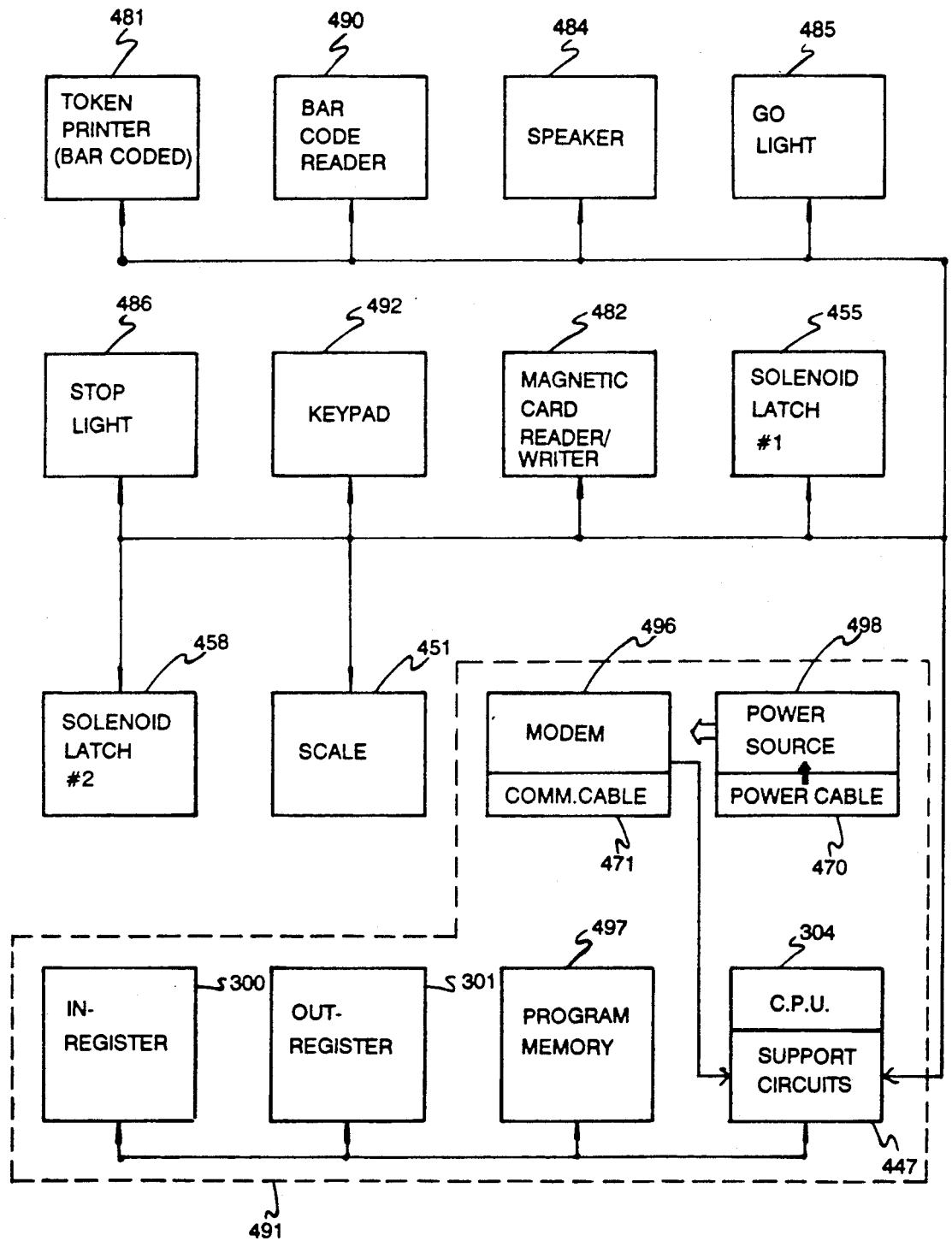
FIG. 11 is a functional diagram of the alternative embodiment presented in FIG. 10.

As is shown in both FIG. 10 and in FIG. 11 which is a functional diagram of the previous figure, electronic circuitry enclosure 491 interacts with a host of user interface devices. Electronic circuitry enclosure 491 receives power from power cable 470 and power source 498 therein provides the required voltage sources for the circuits both within and communicating thereof. Electronic circuitry enclosure 491 contains a CPU 304 which is controlled by a program memory 497 and which is supported by support circuits 447 (including timing circuits, scratchpad RAM memory, I/O circuits, memory management circuits). CPU 304 can access IN-REGISTER 300 and OUT-REGISTER 301 in order to perform weight change comparison operations. CPU 304 can access modem 496 which communicates with distant computing devices via communication cable 471. The CPU 304 of electronic circuitry enclosure 491 can communicate with the various user interface devices present in the embodiment depicted in FIGS. 10 and 11. Scale 451 sends weight signals to CPU 304 indicative of the weight present on scale 451. CPU 304 can send signals to solenoid latches 455 and 458, locking or unlocking either or both latches as required. CPU 304 can send the appropriate signals to token printer 481 causing it to print a bar coded weight token 480. Bar code reader 490 sends bar coded signals read to CPU 304. Bar code reader 490 as shown in FIG. 10 is well known in the art and is of the 'slide over' type. Essentially the bar code that is to be read must be passed at a somewhat constant velocity over light source/detector 446. Such motion is generally not required for the scanning bar code reader typically found in supermarket checkout stations where a scanning laser beam reads the bar code. However, the bar code reader depicted in FIG. 10 is both smaller, lighter, cheaper and easier to construct. CPU 304 can send various audio signals to be played by speaker 484. CPU 304 can send a signal to the GO LIGHT 485 to turn this light source on or off. Similarly, CPU 304 can send a signal to the STOP LIGHT 486 to turn this light source on or off. CPU 304 will receive information from keypad 492 depending on which keys are pressed. CPU 304 will receive information from magnetic card reader/writer 482 as well as write information to magnetic cards placed in magnetic card reader/writer 482. Magnetic card reader/writer 482, as shown in FIG. 10, requires manual 'slidethrough', although other embodiments can be conceived of using a motorized unit, especially if the data density is high enough to require the more constant sliding velocity of a motorized unit. A magnetic card is slid through slot 483 in the direction of the arrows shown. The magnetic band on the card passes over an internal magnetic read and write heads.

When an employee enters supermarket 200, the employee steps on scale 451 and enters his/her employee code via keypad 492, via a bar coded card via bar code reader 490 or via a magnetic card via magnetic card reader/writer 482. The program memory 497 may be programmed to have CPU 304 transmit this information via modem 496 to the store minicomputer 205 where this information can be used for payroll purposes. The CPU 304 then looks at the weight signal from scale 451 and sends the appropriate signals to token printer 481 to print a bar coded weight token, or sends the appropriate signals to magnetic card reader/writer 482 to write a magnetic weight token on the employee's magnetic card or could send a signal indicative of the weight being measured via the modem 496 to the store minicomputer 205 where such weight token could be later accessed when required. After the employee has stepped onto the scale 451, both gates 454 and 457 are locked and the STOP light 486 comes on. After the weight token has been printed (or stored otherwise), the gates 454 and 457 are unlocked and the GO LIGHT 485 comes ON while the STOP light 486 is turned off and the speaker 484 sounds a ready sound.

Upon leaving the store, the employee's bar coded token can be read by bar code reader 490. The weight from the bar coded token is placed in the IN-REGISTER 300 while the weight signal from the scale 451 is placed in the OUT-REGISTER 301 and a comparison operation is performed by CPU 304 on registers 300 and 301. If the weight comparison operation is within predetermined limits then the gates unlock and the employee exits the scale while if there is a weight inequality CPU 304 can via modem 496 alert the minicomputer 205 to alert the store manager and CPU 304 can cause speaker 484 to sound an alarm sound.

Upon leaving the store, the employee can alternatively, slide his/her magnetic employee card through the magnetic card reader/writer 482. The previous magnetic weight token is placed in the IN-REGISTER 300 and the current weight signal is placed in OUT-REGISTER 301 and a comparison operation is performed on these registers. Similarly, the employee can alternatively enter his/her employee number via keypad 492 causing the CPU 304 to check, via modem 496, with the store minicomputer 205 which will indicate that there is a previous weight value for earlier today and which CPU 304 will in turn place into the IN-REGISTER 300. The current value on scale 451 is placed in the OUT-REGISTER 301 and a comparison operation is performed on these registers. By using scale/weight token generators 402 and 412 as required during the workday, the possibility of theft by store employees is greatly reduced. Also of interest, if goods being received by the supermarket through loading doors 401 are always weighed and this weight information is transmitted by the scale/weight token generators 402 to the store minicomputer 205, then another means is created of verifying that delivered products have actually been delivered to the store.

Those skilled in the art will be able to ascertain, using no more than routine experimentation, other equivalents for the method and apparatus above described. Such equivalents are to be included within the scope of the following claims.

I claim:

1. A system providing anti-theft protection to a given area wherein said system comprises:
  (a) first scale means located for use in proximity to the entrance of said area wherein said first scale means sends continous weight signals indicative of the weight of a user upon said first scale means to a first information processing means wherein said first scale means is placed in a depression in the floor so as to allow level movement on and off of said first scale means;
  (b) said first information processing means, upon detecting a change in said continous weight signals from said first scale means, computing, and wherein said continuous weight signals decreasing during said computation said first information processing means sending a warning signal to a prompting means, and sending in turn a signal indicative of a bar code indicative of the said signals from the said first scale means, to a bar code printing means;
  (c) said bar code printing means, upon receiving said signal indicative of a bar code from said first information processing means, printing a bar coded token for the said user indicative of the said user's entrance weight;
  (d) checkout station containing a checkout station bar code reader means and adjacently located second scale means both located at the exit of said area wherein said second scale means is placed in a depression in the floor so as to allow level movement on and off of said second scale means;

(e) said checkout station bar code reader means sending a signal indicative of the weight value indicated by said bar coded token to a checkout station information processing means;

(f) said checkout station information processing means, upon receiving said signal from said checkout station bar code reader means, placing a value indicative of said signal within a first memory register;

(g) bagging area means wherein said user can temporarily leave bags containing purchased articles while said user is on said second scale means for exit weighing operation;

(h) said second scale means sending a signal indicative of the weight of the said user upon said second scale means to said checkout station information processing means wherein said checkout station information processing means then places a value indicative of said signal within a second memory register; and (i) comparison by said checkout station information processing means of the contents of the said first memory register with the said second memory register wherein if the difference between the values of the two said memory registers exceeds a first predetermined value, then the said checkout station information processing means sends a weight inequality signal to an operator display associated with said checkout station whereupon an operator utilizes an operator keypad associated with said checkout station to send a decision signal back to said checkout station information processing means wherein said decision signal can alternatively instruct the said checkout station information processing means to ignore the difference between said two memory registers or can instruct the said checkout station information processing means to activate an alarm circuit, and wherein if the difference between the values of the two said memory registers exceeds a second predetermined value, then said alarm circuit is activated.

2. The anti-theft system of claim 1 whereby a single scale means is located in proximity to both the entrance and the exit of the said area and is thus used as both the said first scale means and, for a given user, again at a later time as the said second scale means.

3. The anti-theft system of claim 1 whereby a single information processing means performs the functions of both the said first information processing means and the said checkout station information processing means.

* * * * *